May 13, 1924.
E. A. CHASE
STONE FINISHING MACHINE
Filed May 26, 1920
1,493,519
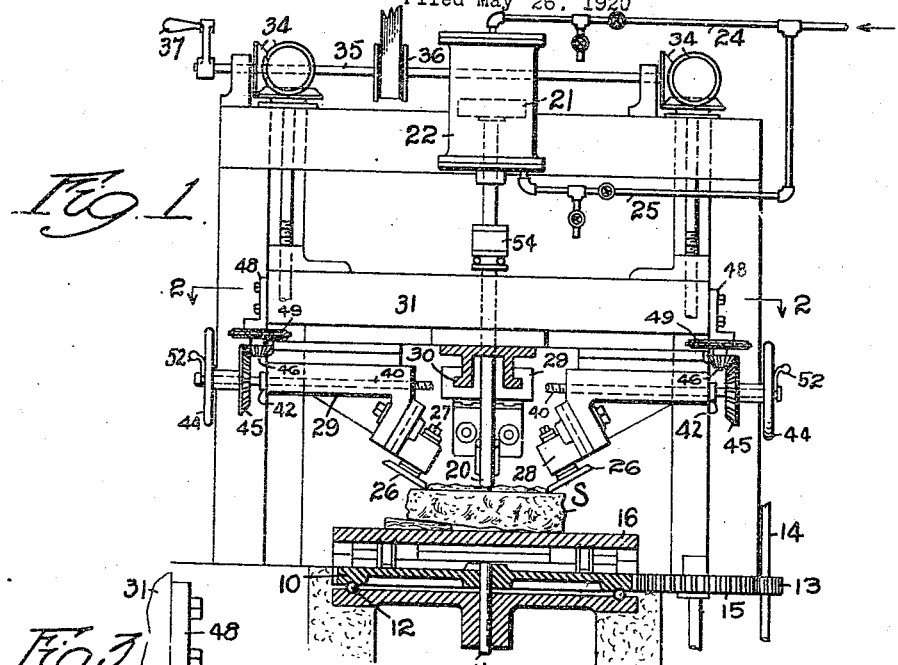
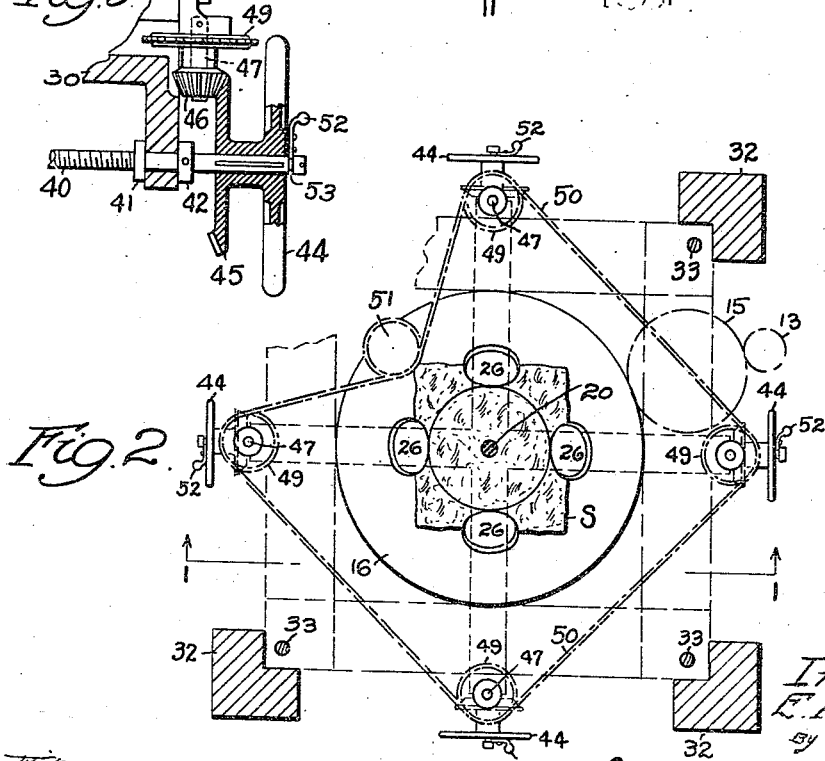
Inventor
E. A. Chase
by attorneys
Southgate & Southgate
Witness
C. F. Wilson.

Patented May 13, 1924.

1,493,519

UNITED STATES PATENT OFFICE.

ELROY A. CHASE, OF NORTHFIELD, VERMONT.

STONE-FINISHING MACHINE.

Application filed May 26, 1920. Serial No. 384,247.

*To all whom it may concern:*

Be it known that I, ELROY A. CHASE, a citizen of the United States, residing at Northfield, in the county of Washington and State of Vermont, have invented new and useful Stone-Finishing Machines, of which the following is a specification.

This invention relates to a machine for producing a finished surface on a block of granite or other similar material.

It is the general object of my invention to provide an improved machine for this purpose by which the finished operation may be performed with speed and economy.

With this general object in view, one feature of my invention relates to the provision of a horizontally rotatable work-supporting table, together with suitable driving mechanism therefor.

Another feature relates to the provision of a device engaging the face of the stone and pressing the same firmly against the table as the latter is rotated.

I also provide improved cutting devices and feeding means therefor, by which each cutter may be fed manually or automatically as desired.

My invention further relates to arrangements and combinations of parts hereinafter described and more particularly pointed out in the appended claims.

A preferred form of my invention is shown in the drawings, in which—

Fig. 1 is a front elevation of my improved machine, certain parts being shown in section.

Fig. 2 is a sectional plan view thereof, taken along the line 2—2 in Fig. 1; and Fig. 3 is a detail sectional elevation of the feeding mechanism.

Referring to the drawings, I have shown a work-supporting table 10, having a shaft 11 and rotatable in a horizontal plane, preferably upon ball bearings 12.

Gear teeth may be provided around the periphery of the table 10 so that the table may be rotated from a pinion 13 on a drive shaft 14, the pinion 13 being connected to the table through an idle gear 15. The stone "S" is supported on the table in any convenient manner and is shown herein as resting on wedges on a movable platform or car 16 which is adapted to be rolled into position on the table with the stone "S" already placed thereon. This particular method of supporting and positioning the stone is not essential, however, and the stone may be held in a suitable chuck or may rest directly upon the table. Where the stones are of considerable size, however, the construction shown in the drawings is desirable.

I have also provided special means for holding the stone firmly against its seat on the support 16, such means comprising a presser bar 20, connected to a piston 21 in a cylinder 22. The cylinder is connected through pipes 24 and 25 to a supply of compressed air, steam or other fluid by which pressure may be applied to either side of the piston 21 as desired.

When the pressure is applied to the upper side of the piston, the presser rod 20 is yieldingly forced downward against the stone "S" and in line with the axis of the table 10. The rod then holds the stone yieldingly against the table and supplements the force of gravity in preventing displacement.

A plurality of cutters 26 are mounted for free rotation on short shafts 27 each having an inclined bearing 28 carried by a cross slide 29. The slides 29 are mounted on guides 30, secured to a frame 31 mounted to slide vertically between corner posts 32.

Adjusting screws 33 are provided at each corner of the frame for raising and lowering the same. These screws are connected to rotate together by means of a series of bevel gears 34 and cross shafts 35. One of the cross shafts may be provided with a driving pulley 36 by which the frame may be raised and lowered by power and a handle 37 may be provided for hand adjustment.

Cross feed screws 40 are provided for the cross slides 29, the feed screws having bearings in the frame 31 and being held from longitudinal movement by collars 41 and 42 (Fig. 3). A hand wheel 44 is keyed to each feed screw 40 but is slidable thereon, and each hand wheel has a bevel gear 45 mounted to rotate therewith.

A bevel pinion 46 is fixed to the lower end of a short shaft 47 rotatable in a bearing bracket 48 mounted on the frame 31 and having a driving sprocket 49 at its upper end. The sprockets 49 and bevel pinions 46 are continuously rotated by a drive chain 50 (Fig. 2), driven from a sprocket 51 suitably connected to the driving mechanism.

A latch 52 (Fig. 3) is mounted to slide radially on each hand wheel 44 and in one position engages a groove 53 formed near the end of the cross feed screw 40. When the latch is in the groove 53, the bevel gear 45 meshes with the bevel pinion 46 and is rotated thereby. Means is thus provided for simultaneously rotating all of the feed screws and for thus simultaneously advancing all of the cutters 26. These cutters may be adjusted so that they all work together in making a single cut over the face of the stone, or they may be adjusted in four slightly separated planes so that they will remove successive layers of material from the stone. Adjustment for this purpose is provided between the bearings 28 and the cross slides 29.

By withdrawing the latch 52 and sliding the hand wheel 44 and gear 45 outward on the feed screw 40, the corresponding cutter may be moved manually to any desired position, after which the feed is thrown in by pushing the hand wheel and bevel gear back to latched position.

Having thus fully described my invention, the operation should be apparent. The stone "S" is adjusted in position on the support 16 by wedges or in any other convenient manner and is then moved to a central position on the table 10. The presser bar 20 is lowered to engage the stone along the line of the axis of the table and the table is then rotated through the gear train previously described.

An anti-friction connection 54 between the upper and lower parts of the piston rod 20 permits the lower end to rotate freely with the stone.

The several cutters 26 are adjusted vertically and horizontally to their proper relative positions and are then advanced simultaneously toward the center by the operation of the drive chain 50.

By the use of this machine the time required to finish a block of stone of a given size is very greatly reduced while, at the same time, superior work is produced.

From this description of my invention, it will be evident that changes and modifications can be made therein by those skilled in the art within the spirit and scope of my invention as set forth in the claims and I do not wish to be otherwise limited to the details herein disclosed, but what I claim is:—

1. A stone finishing machine having, in combination, a work support mounted to rotate in a horizontal plane, means to rotate said support, a plurality of cross slides, radially spaced guide-ways for said cross slides, a stone cutting tool mounted on each cross slide, means to move each cross slide manually toward and from the axis of said support, and means to move each cross slide automatically toward and from the axis of said support, said manual means and said automatic means being alternately applicable to any selected cross slide entirely separate from the operation of all of the other cross slides.

2. A stone finishing machine having, in combination, a work support mounted to rotate in a horizontal plane, means to rotate said support, a plurality of cross slides, radially spaced guide-ways from which said cross slides depend, a stone cutting tool mounted on each cross slide, automatic feeding means for said slides, and independent devices to connect said feeding means to any selected cross slide separately.

3. A stone finishing machine having, in combination, a work support mounted to rotate in a horizontal plane, means to rotate said support, a plurality of cutting devices mounted for movement along different angularly disposed axial paths across the face of said support, means to feed said cutting devices toward and from the axis of said support, and means to vertically adjust all of said cutting devices and the feeding means collectively as a single unit to cause said devices to remove successive thin layers of material from the upper face of the work.

In testimony whereof I have hereunto affixed my signature.

ELROY A. CHASE.